United States Patent

[11] 3,586,790

[72] Inventors Kurt Guttinger
Pfaffhausen;
Willi Nyffenegger, Oberehrendingen, both of, Switzerland
[21] Appl. No. 785,572
[22] Filed Dec. 20, 1968
[45] Patented June 22, 1971
[73] Assignee Dictaphone International AG
Wettingen, Aargau, Switzerland
[32] Priority Dec. 21, 1967
[33] Switzerland
[31] 17,954/67

[54] CORRECTION SYSTEM FOR DICTATING MACHINE
6 Claims, 3 Drawing Figs.

[52] U.S. Cl. .......... 179/100.2, 274/4
[51] Int. Cl. .......... G11b 27/08
[50] Field of Search .......... 179/100.1DR, 100.2B, 6; 274/4.2

[56] References Cited

UNITED STATES PATENTS 3,197,562 7/1965 Happold et al. .......... 179/100.1
3,426,161 2/1969 Dollenmayer .......... 179/100.1

*Primary Examiner*—Bernard Konick
*Assistant Examiner*—Robert S. Tupper
*Attorney*—Curtis, Morris & Safford

ABSTRACT: A correction system for a dictating machine having a soundhead carriage movable along the length of a cylinder which carries on its surface a magnetic recording medium of the belt or sheet type. The system includes a correction slide which can be placed in the path of the soundhead carriage as it advances along the cylinder. The correction slide has a switch adapted to be activated by the soundhead carriage which, when activated, changes the machine from its recording state to its reproducing state. This correction slide is used to prevent correct text from being mistakenly or carelessly erased or recorded over when making a correction.

PATENTED JUN 22 1971

3,586,790

INVENTORS
KURT GÜTTINGER
WILLI NYFFENEGGER
BY
Curtis, Morris & Safford
ATTORNEYS

CORRECTION SYSTEM FOR DICTATING MACHINE

The invention relates to dictating machines which use magnetic sheets or belts as magnetic sound-recording media.

More specifically this invention relates to such machines which contain a motor-driven cylinder for receiving the recording medium; a soundhead carriage, with a soundhead for recording, reproducing and erasing sound; and a control circuit for setting the operating states of the machine. The soundhead carriage is guided parallel to the cylinder and is adapted to be moved back and forth by hand or by a controlled driving device from a starting position at the front of the cylinder to a finishing position at the end of the cylinder.

Frequently, when using such dictating machines, text recorded on the recording medium must be corrected, i.e. old text must be removed and new text inserted. To make such a correction the start of the passage to be corrected first must be found on the recording medium by replaying the recorded text. Then, to insert new text, the machine must be switched for recording and the new text spoken while the original text, at the same time, is erased. When making such a correction, it is important that the text following the passage to be corrected is not erased or spoken over and that the entire passage to be corrected is erased. To assure this when the machine is switched to recording for making a correction, the soundhead must only be allowed to move from the start point to the point on the recording medium at which the text to be corrected ends.

In order to locate text passages easier, dictating machines using magnetic sheets (sometimes called foils) or belts generally have a pointer which moves over a scale to indicate the respective position of the soundhead with respect to the recording medium, which, as indicated, can be, for example, a magnetic sheet. In the simplest indicator of this type the pointer is secured directly to the soundhead carriage and the scale is a graduated scale which extends parallel to the cylinder axis over the entire width of the magnetic sheet. Because the indicating accuracy of such indicators decreases directly with the spacing between the sound tracks on the magnetic sheet, when track spacing is close, such an indicating device serves only for rough orientation and can be used only to indicate generally the sound tracks on the magnetic sheet.

For fine adjustment a diagonal stroke marked on each magnetic sheet and a graduated scale adjacent to the cylinder extending parallel to the cylinder axis is used. Despite its simplicity, this type of indicating device is sufficiently accurate.

Instead of straight graduated scales circular scales and a pointer turning in synchronism with the rotating cylinder are frequently used. With these, or similar devices, any point on the sound track can be located with sufficient accuracy, but the location is effected by an indication only. According, to correct text it is necessary, therefore, to first determine and mark the pointer position indicating the end of the text to be corrected and then to observe the pointer during the correction so that when the marked position is reached, the machine can be disconnected or switched from recording to reproduction. This technique not only is cumbersome but requires the strict attention of the machine operator. Carelessness or mistakes in making such corrections frequently leads to loss of time since, if the correct moment for switching the machine is missed, the correct text is spoken over and this spoken-over text subsequently must be corrected, i.e. reinserted.

The object of this invention is to provide a dictating machine where such inconveniences and difficulties in making corrections are eliminated.

The dictating machine constructed in accordance with this invention has a correction slide associated with the sound head carriage. This slide carries a switch connected to the control circuit which is adapted to be actuated by the soundhead carriage. The slide can be set by hand to a position between the soundhead carriage and the rear of the cylinder and can be moved along the cylinder while the cylinder rotates.

Advantageously this correction slide can be adapted to be moved by the soundhead carriage when it advances. Accordingly, when the correction slide is so adapted, the switch, carried by the correction slide, advantageously is connected into the control circuit for switching the machine from recording to reproducing when actuated by the soundhead carriage.

This switch advantageously consists of a pair of normally open contacts, one being a fixed contact and the other being an elastic contact which is adapted to be actuated, i.e. moved into contact with the other switch by the soundhead carriage. The fixed contact advantageously can be designed as a stop to engage the soundhead carriage so that the correction slide will be moved along with it.

The soundhead carriage and the correction slide also advantageously are arranged on a common guide and the soundhead carriage and correction slide each have a key with a finger support, (sometimes called a fingerpiece). The sides of these keys can be designed to oppose each other and to almost, but not quite, touch each other when the soundhead carriage and the correction slide are close together.

A dictating machine embodying this invention is represented in the attached drawing in which.

Figure 1:
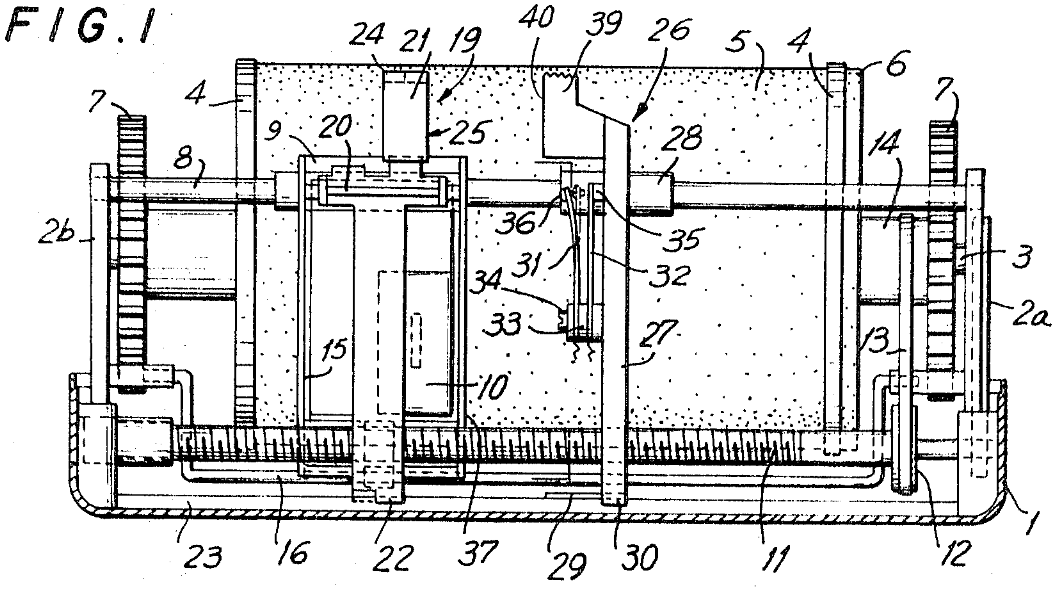
FIG. 1 shows a front elevation of this dictating machine with its cover removed to show the details of the correction system.

In the dictating machine represented in the drawing, two bearing blocks 2*a* and 2*b* are arranged in the housing bottom 1. These bearing blocks carry a shaft 3 having a cylinder 4 secured thereon. A magnetic sheet, or foil, 5 is secured on this cylinder in known manner. The cylinder 4 is driven by an electromotor, not represented in the drawing, by, for example, a friction wheel gear and a magnetic clutch, of which only wheel gear 6 secured to cylinder shaft 3 is shown in FIG. 1. This cylinder shaft also carries a handwheel 7 at each end with which the cylinder can be turned by hand. A guide 8 extending parallel to the cylinder shaft is secured in the two bearing blocks 2*a*, 2*b*. A soundhead carriage 9 of known design is mounted to slide on this guide. A soundhead is mounted in the soundhead carriage 9. The machine has a driving spindle 11 for moving the soundhead carriage 9. This spindle 11 is mounted at its ends for rotation in the bearing blocks 2*a*, 2*b*. Spindle 11 is driven by cylinder shaft 3, acting in cooperation with appropriate linkage, i.e., for example, cam belt 13 and cooperating pulleys, or wheels, 12 and 14 each respectively attached to the cylinder shaft and the spindle.

When the driving spindle 11 rotates, the soundhead carriage 9 is caused to move from the front, or left end of the cylinder as shown in the drawing, to the rear, or right side of the cylinder as shown in the drawing. The soundhead 10 is able to pass over the entire width of the magnetic sheet.

In magnetic sheet type dictating machines, the magnetic sheet is frequently attached at its front edge to the cylinder so that it freely rests on the cylinder surface when the cylinder rotates. Because no other fastening means are provided, the cylinder can be allowed to turn only in one direction, i.e. the feeding direction, otherwise, the free end of the foil would come loose from the cylinder and become damaged by contact with the machine. Thus, a reverse rotation of the cylinder, and, thus, also, of the driving spindle for the soundhead carriage, is not possible. Accordingly, for returning the soundhead carriage a return device, or method, other than reversing the direction of rotation of the cylinder must be provided. Such another return device can consist, for example, of a lever having a ridge at both ends for engaging the thread of the driving spindle, which is rotatably mounted on the lower crossbar of the soundhead carriage frame 15. This lever is under spring pressure so that, when the carriage frame is tilted about the guide 8, one ridge leaves the spindle thread. Then when the frame is tilted back, it engages the preceding turn of the thread. When this happens the soundhead carriage is pushed back by one turn, that is, a sound track.

Figure 2:
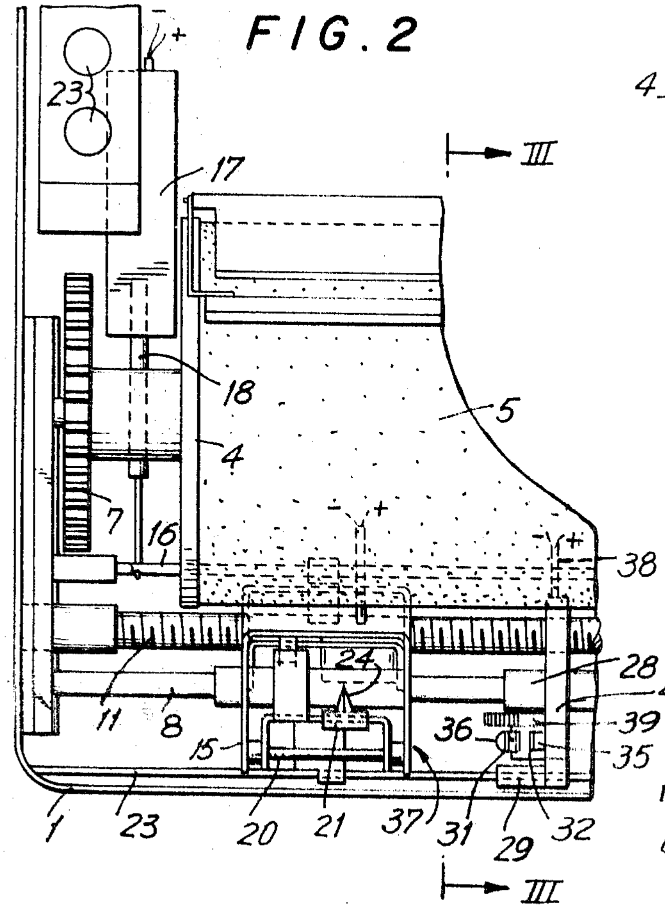
FIG. 2 shows, in section, a top plan view of the left part of the machine shown in FIG. 1.
Figure 3:
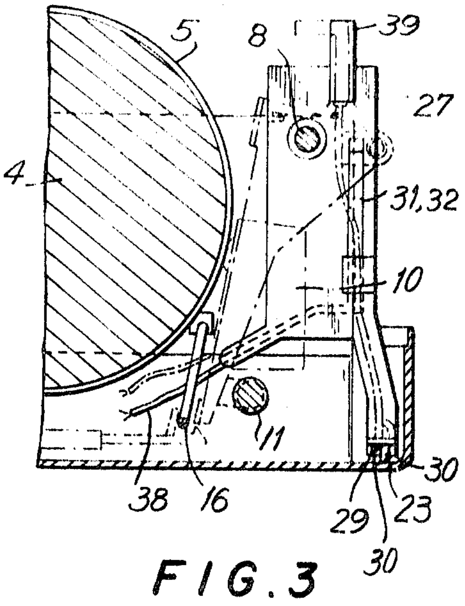
FIG. 3 shows a partial section along the line III–III of FIG. 2.

For the automatic return of the soundhead carriage a stirrup 16 is provided. A U-shaped lug which is attached to the carriage frame slides on the stirrup. The stirrup 16 is held in its rest position by a spring. When the stirrup 16 is turned a short distance, it moves the lug, thus tilting the carriage frame to provide one return step. The stirrup 16 is actuated by means of a magnet coil 17 (see FIG. 2) which surrounds an armature 18. This armature acts on the stirrup when the magnet coil is fed with current impulses from the control circuit.

In order to return the soundhead carriage by hand, a key 19 is provided to enable the soundhead to be tilted by hand from its rest position. When tilted thusly, the thread ridges of the lever on the lower crossbar of the carriage frame leave the thread on the spindle. Then the carriage may be slid backwards or forwards, to the left or right, along guide 8. The key 19, as represented in the drawing, can be a lever which can be turned about a swivel, or pivot axis, 20 in the upper frame which axis is arranged outside the swivel, or pivot axis, of the carriage frame. The upper end of the lever is designed as finger support, or fingerpiece, 21 and the lower end of the lever is provided with projections 22 which are bent in opposite directions and which engage and slide on opposite sides of a guide bar 23 when the carriage is moved. This guide bar 23 is arranged in the housing bottom 1 and extends in the longitudinal direction of the cylinder. Because of this guide, the key 19 can only move in a vertical direction. Thus, when the key 19 is pressed down, the lower end of the carriage frame 15 is caused to be lifted from the driving spindle 11.

The finger support 21 of the key 19 has a pointer 24 at its upper end which glides along a graduated scale in the housing cover, thus permitting a rough determination of the position of the soundhead with respect to the magnetic sheet. The finger support 21 has a vertical side edge 25, whose use will be described further below, facing the rear end, i.e. the right end, of the cylinder.

The various operating states of the machine, particularly for the feed and the return of the soundhead carriage, and to record and reproduce, are started in a known manner by a control circuit, of which only the control buttons 23 (see FIG. 2) are shown in the drawing.

According to the invention, a correction slide 26, which can be displaced along the driving cylinder 4, is associated with the soundhead carriage. This correction slide 26, as shown in the drawing, consists of a flat slide body, or body member, 27 made of an electrically insulating plastic. This slide body 27 is attached to a sleeve 28 which is displaceably, i.e. slidably, mounted on the guide bar 8 which carries the soundhead carriage. In order to prevent turning and canting of the correction slide about the guide 8, the lower end of the slide body 27 is designed as is shown, with a U-shaped recess whose two legs, or arms. 30 slide on the guide bar 23 on the housing bottom 1.

A pair of contact springs 31, 32 is arranged on the side of the slide body 27 facing the soundhead carriage 9. These two contact springs 31, 32 are arranged in series, as viewed in the direction of displacement of the slide. They are secured, for example, on the slide by screwing their lower ends on the slide body 27 by means of a head screw 34. An electrically insulating piece 33 is used as an intermediate piece between these lower contact ends. The upper end of the contact spring 32 nearest to the slide body 27 has a flat contact (not represented in the drawing for sake of clarity) which rests on a support 35 on the slide body and thus forms a fixed stop. The other contact spring 31 is bent away from the first contact spring 32, so that the contact pair is open in rest position. The upper end of spring 31 has a contact tip on the side facing the fixed contact spring 32. On the other side it has a cover 36 of electrically insulating material. The two contact springs 31 and 32 are so arranged on the slide body 27 that when the soundhead carriage 9 moves forward into engagement with the correction slide, the end face 37 of the soundhead carriage presses the upper end of the contact spring 31 into contact with the spring 32. This causes the circuit to close. A further movement of the soundhead carriage 9 against the support, or stop, 35 causes the correction slide 26 to be displaced, i.e. to be moved. together with the soundhead carriage. The two contact springs 31, 32 are so connected with the control circuit of the dictating machine by the connecting lines 38 secured to the slide body 27 that the machine switches from recording to reproduction when the contacts 31, 32 are closed. A nose, or extension, 39 with a finger support, or fingerpiece, which projects in the direction of the soundhead carriage, is secured at the upper end of the slide body 27. This finger support provides a means to move the correction slide 26 on the guide 8 by hand. The side of the nose, extention, extension 39 facing the soundhead carriage is a vertical edge 40. This extention 39, and the correction slide 26 are formed so that, when the soundhead carriage is advanced, the vertical edges 25 and 40 oppose each other, but have a small interval therebetween, so that no part of the correction slide, except the contact spring 31, is touched by the soundhead carriage. This ensures and provides for fine adjustment of the correction slide.

In the normal operation of the dictating machine, the correction slide 26 is pushed to the rear end of the cylinder, as far to the right as possible. It remains there during normal use. If a correction is necessary in the spoken text, the end of the passage to be corrected is first determined by playing the recorded text back to the end of the text to be corrected and stopping the feed, i.e. movement, of the soundhead carriage 9 at that point. The correction slide 26 is then moved by hand up to the resting soundhead carriage. The soundhead carriage then is returned by hand, or possibly by actuating a return key on the microphone, beyond the passage to be corrected and the machine is switched to reproduction. When the beginning of the passage to be corrected is reached, the machine is switched to recording and correct text is recorded over the incorrect text. The distance between the two vertical marking edges 25 and 40, which diminishes with the advancement of the soundhead carriage, provides an indication of the amount of time and the length of magnetic sheet that is still available for making the correction. This indication is advantageous so that, if necessary, the correction easily can be completed, for example by faster speaking, before the point marked by the correction slide is reached. If the correction is completed, i.e. insert, before the end point of the text to be corrected is reached, the remaining text is allowed to be erased up to the point where the correction slide is set. Then, when the end of the text to be corrected is reached, the soundhead carriage strikes the correction slide, causing the contacts 31, 32 to close. At this point the machine switches automatically from recording to reproducing and the soundhead carriage, as it advances, pushes the correction slide ahead of it. Because of the machine is switched into its reproducing state, the correct text following the corrected passage cannot be impaired.

As can be seen when using the above described, or a similar correction slide, the end of the passage to be corrected cannot be passed, i.e. spoken over, by oversight or by carelessness causing correct text to be erased. The machine operator does not have to be aware or remember marked positions, for example, positions marked by pointers. He, thus, is able to concentrate completely on his dictation. Furthermore, he receives an indication by the vertical marking edges described previously for determining the proper speed for his dictation when making a correction. The correction system shown, although simply designed and easy to handle, fully meets the purposes and objects set forth above.

What we claim is:

1. A dictating machine for use with a magnetic recording medium, comprising, in combination, a driven cylinder for receiving the recording medium, a soundhead carriage mounted to reciprocate along a path of movement parallel to the a axis of the cylinder, a soundhead carried by said soundhead carriage, a control circuit operably connected to said machine for adjusting the operating state of the dictating machine, a correction slide slidably mounted in said path of movement of said soundhead carriage for movement between the soundhead carriage and one end of the cylinder, said correction slide being selectively movable independently of said soundhead carriage to positions between said soundhead and said one end of said cylinder, switch means carried by said correction slide and operably connected to said control circuit for switching said machine from recording to reproduction when said carriage is moved into engagement with said correction slide.

2. A dictating machine as described in claim 1 wherein said correction slide is selectively displaced by said soundhead carriage when said carriage is engaged with said slide and advances towards said one end of said cylinder.

3. A dictating machine as described in claim 2 wherein said switch comprises a pair of normally open contacts, one of said contacts being fixed and the other of said contacts being flexible, said flexible contact moving into contact with said fixed contact when said soundhead carriage moves into engagement with said correction slide and said fixed contact defining a stop for the displacement of the correction slide by the soundhead carriage.

4. A dictating machine as described in claim 3 wherein said soundhead carriage and said correction slide each have a key having a finger support, said keys having opposing vertical side edges which are in close proximity to each other when said soundhead carriage is adjacent said correction slide.

5. A dictating machine as described in claim 4 wherein said soundhead carriage and said correction slide are positioned on a common guide member.

6. In a correction system for a dictating machine of the type using a magnetic recording medium and which has at least one motor-driven cylinder for receiving the recording medium, a soundhead carriage mounted for reciprocating movement along a path parallel to the axis of said cylinder, a soundhead for recording, reproducing and erasing carried by said soundhead carriage and a control circuit operably connected to said machine for adjusting the operating state of said dictating machine, the improvement comprising, a correction slide mounted in the path of movement of said soundhead carriage for movement between the soundhead carriage and one end of said cylinder, said correction slide being selectively movable independently of said soundhead carriage to positions between said soundhead carriage and said one end of said cylinder, switch means carried by said correction slide and connected to said control circuit for switching said machine from recording to reproduction when said carriage is moved into engagement with said correction slide.